(12) United States Patent
Higuchi et al.

(10) Patent No.: US 8,737,283 B2
(45) Date of Patent: *May 27, 2014

(54) TRANSMISSION DEVICE AND TRANSMISSION METHOD

(71) Applicant: NTT DoCoMo, Inc., Tokyo (JP)

(72) Inventors: Kenichi Higuchi, Yokohama (JP);
Yoshihisa Kishiyama, Yokosuka (JP);
Mamoru Sawahashi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/763,299

(22) Filed: Feb. 8, 2013

(65) Prior Publication Data

US 2013/0176931 A1    Jul. 11, 2013

Related U.S. Application Data

(63) Continuation of application No. 12/161,350, filed as application No. PCT/JP2007/050170 on Jan. 10, 2007, now Pat. No. 8,472,363.

(30) Foreign Application Priority Data

Jan. 18, 2006   (JP) ................................ 2006-010497

(51) Int. Cl.
| | |
|---|---|
| H04H 20/71 | (2008.01) |
| H04W 4/00 | (2009.01) |
| H04B 7/216 | (2006.01) |
| H04J 3/00 | (2006.01) |
| H04L 12/28 | (2006.01) |

(52) U.S. Cl.
USPC ........... 370/312; 370/328; 370/335; 370/343; 370/390

(58) Field of Classification Search
None
See application file for complete search history.

(56) References Cited

U.S. PATENT DOCUMENTS

| | | | |
|---|---|---|---|
| 7,346,316 B1 | 3/2008 | Kubo | |
| 7,813,261 B2 | 10/2010 | Ma et al. | |
| 7,894,818 B2 | 2/2011 | Khan | |
| 2006/0285483 A1* | 12/2006 | Khan | ............................ 370/208 |
| 2007/0104151 A1 | 5/2007 | Papasakellariou et al. | |

FOREIGN PATENT DOCUMENTS

| | | |
|---|---|---|
| EP | 1073214 A1 | 1/2001 |
| EP | 1734684 A1 | 12/2006 |
| EP | 1898543 A1 | 3/2008 |

(Continued)

OTHER PUBLICATIONS

T. Ohtsu, "Challenge to Systems Beyond IMT-2000—Approach in wireless—", ITU Journal vol. 33, No. 3, pp. 26-30, Mar. 2003, 11 pages.

(Continued)

*Primary Examiner* — Faruk Hamza
*Assistant Examiner* — Diane Lo
(74) *Attorney, Agent, or Firm* — Osha Liang LLP (57) ABSTRACT

A disclosed OFDM-based transmission device includes a unicast channel generating unit configured to generate a unicast channel; an MBMS channel generating unit configured to generate an MBMS channel; a multiplexing unit configured to time-division-multiplex the unicast channel and the MBMS channel in the same frequency band; and a transmitting unit configured to transmit time-division-multiplexed transmission symbols. In the disclosed transmission device, the guard interval length for the MBMS channel is set longer than the guard interval length for the unicast channel.

2 Claims, 11 Drawing Sheets

(56) References Cited

FOREIGN PATENT DOCUMENTS

| JP | 2002-26808 | 1/2002 |
|---|---|---|
| JP | 2007-194867 A | 8/2007 |
| WO | 2005041515 A1 | 5/2005 |
| WO | 2006/102746 A1 | 10/2006 |

OTHER PUBLICATIONS

3GPP TR 25.814 V1.0.1, "3rd Generation Partnership; Technical Specification Group Radio Access Network; Physical Layer Aspects for Evolved UTRA (Release 7)", Nov. 2005, (72 pages).
Qualcomm Europe, "TP on channel structure for E-UTRA MBMS evaluation", 3GPP TSG-RAN WG1 #43 R1-051493, Nov. 7-11, 2005; Seoul, Korea; Internet <URL:http://www.3gpp.org/ftp/tsg_ran/WG1_RL1/TSGR1_43/Docs/R1-051493.zip>, (6 pages).
LG Electronics, "MBMS transmission in E-UTRA", 3GPP TSG-RAN WG1 #43 R1-051300, Seoul, Korea; Nov. 7-11, 2005; Internet <URL:http://www.3gpp.org/ftp/tsg_ran/WG1_RL1/TSGR1_43/Docs/R1-051300.zip>, (4 pages).
Samsung, "Further Details on Adaptive Cyclic Delay Diversity Scheme," 3GPP TSG-RAN WG1 Meeting #42bis R1-051046, San Diego, USA, Oct. 10-14, 2005; Internet <URL:http://www.3gpp.org/ftp/tsg_ran/WG1_RL1/TSGR1_42bis/Docs/R1-051046.zip>, (8 pages).
International Search Report issued in PCT/JP2007/050170, mailed on Feb. 6, 2007, with translation, 5 pages.
Written Opinion issued in PCT/JP2007/050170, mailed on Feb. 6, 2007, no translation, 4 pages.
Japanese Office Action for Application No. 2006-010497, mailed on Nov. 4, 2009 (5 pages).
NTT DoCoMo et al., "Physical Channels and Multiplexing in Evolved UTRA Downlink", 3GPP TSG RAN WG1 #42 on LTE; R1-050707, London, UK, Aug. 29-Sep. 2, 2005.
Russian Office Action for Application No. 2008133319/09, mailed on May 20, 2010 (9 pages).
Chinese Office Action for Chinese Application No. 200780009579.6, mailed on May 11, 2010 (12 pages).
3GPP TR 25.814 V1.0.1, 3rd Generation Partnership Project; Technical Specification Group Radio Access Network; Physical Layer Aspects for Evolved UTRA (Release 7), pp. 17, 18, 25 and 44-46; (Nov. 2005)<URL:http://www.3gpp.org/ftp/Specs/archive/25_series/25.814/25814-101.zip>.
Japanese Office Action for Application No. 2009-164285, mailed on Aug. 16, 2011. (8 pages).
Patent Abstracts of Japan for Japanese Publication No. 2007-194867, publication date Aug. 2, 2007 (1 page).
Extended European Search Report dated Mar. 6, 2014 in related European application No. 07706517.5 (10 pages).
3GPP TSG RAN WG1 Meeting #43, R1-051431, "Multiplexing of Multicast/Broadcast and Unicast Services", Seoul, Korea, Nov. 7-11, 2005 (2 pages).
3GPP TSG RAN WG1 Meeting #41, R1-050464, "Physical Channel Structures for Evolved UTRA", Athens, Greece, May 9-13, 2005 (13 pages).
3GPP TSG RAN WG1 LTR Ad Hoc Meeting, R1-060035, "MBMS Channel Structure for E-UTRA Downlink", Helsinki, Finland, Jan. 23-25, 2006 (4 pages).

* cited by examiner

| MCS NUMBER | DATA MODULATION | CHANNEL CODING RATE | RELATIVE INFORMATION RATE |
|---|---|---|---|
| MCS1 | QPSK | 1/3 | 1 |
| MCS2 | QPSK | 1/2 | 1.5 |
| MCS3 | QPSK | 2/3 | 2 |
| MCS4 | QPSK | 6/7 | 2.57 |
| MCS5 | 16QAM | 1/2 | 3 |
| MCS6 | 16QAM | 2/3 | 4 |
| MCS7 | 16QAM | 3/4 | 4.5 |
| MCS8 | 16QAM | 5/6 | 5 |
| MCS9 | 16QAM | 6/7 | 5.24 |
| MCS10 | 16QAM | 8/9 | 5.33 |

RECEPTION SIR ↓

FIG.3A

ONE SUBFRAME

TIME

TRANSMISSION DEVICE AND TRANSMISSION METHOD

CROSS-REFERENCE TO RELATED APPLICATIONS

The present application is a continuation application of and, thereby, claims benefit under 35 U.S.C. §120 to U.S. patent application Ser. No. 12/161,350 filed on Jul. 18, 2008, titled, "TRANSMISSION DEVICE AND TRANSMISSION METHOD," which is a national stage application of PCT Application No. PCT/JP2007/050170, filed on Jan. 10, 2007, which claims priority to Japanese Patent Application No. JP2006-010497 filed on Jan. 18, 2006. The contents of the priority applications are incorporated by reference in their entirety.

TECHNICAL FIELD

The present invention generally relates to wireless communication technologies. More particularly, the present invention relates to a transmission device and a transmission method for transmitting a multicast broadcast channel.

BACKGROUND ART

Next-generation mobile communication systems to be used mainly for video and data communications require capability far greater than that of the third generation mobile communication system (IMT-2000) to achieve high-volume, high-speed broadband communications. In such a next generation system, packet switching is used, instead of conventional circuit switching, even for wireless sections to improve the use efficiency of communication resources. Meanwhile, there are various indoor and outdoor communication environments. In the outdoor communication environment, for example, multiple cells (multi-cell) covering a broad area are set up to enable high-speed packet transmission for mobile stations moving at high speed. In the indoor communication environment where attenuation of radio waves is high, indoor access points are used instead of outdoor base stations to support wireless communications. Also, for communications between base stations or upper devices and mobile stations, especially for downlink data transmission, multicast and broadcast are used in addition to unicast (for future trends of communication systems, see, for example, non-patent document 1).

In a broadband mobile communication system, the influence of frequency selective fading due to the multipath environment is significant. To solve this problem, orthogonal frequency division multiplexing (OFDM) is expected to be used for next-generation communication systems. In OFDM, a symbol comprises an effective symbol section containing information to be transmitted and a guard interval attached to the effective symbol section, and multiple symbols are transmitted during a transmission time interval (TTI). The guard interval is generated based on a part of information in the effective symbol section. The guard interval is also called a cyclic prefix (CP) or overhead.

[Non-patent document 1] Ohtsu: "A Challenge to Systems beyond IMT-2000—Approach from Wireless—", ITU Journal, Vol. 33, No. 3, pp. 26-30, March 2003

DISCLOSURE OF INVENTION

Problems to be Solved by the Invention

A receiving end receives paths with various propagation delays. With OFDM, it is possible to effectively reduce intersymbol interference if the propagation delays are within the duration of a guard interval. In other words, it is possible to effectively combine various delayed waves by increasing the duration of a guard interval. This is especially preferable when communications are performed in a cell with a very large radius or when the same information is transmitted at the same time via various cells to mobile stations by multicast or broadcast. However, because the guard interval is merely a part of information in the effective symbol section, increasing the duration of the guard interval is not preferable in terms of information transmission efficiency. Meanwhile, in environments such as urban areas and the inside of buildings where the propagation delay is comparatively small or in environments where unicast is used, enough communication quality may be obtained with a comparatively short guard interval. Thus, the optimum guard interval length differs depending on communication environments. One way to cope with this problem is to prepare multiple groups of radio parameters defining symbols having guard intervals of various lengths and to select an optimum symbol format for each wireless communication. However, processing signals according to various symbol formats may greatly increase the workload, and therefore this method is not suitable for mobile stations having comparatively simple configurations. Thus, methods for efficiently transmitting channels with different guard interval lengths have not been established yet.

Embodiments of the present invention make it possible to solve or reduce one or more problems caused by the limitations and disadvantages of the background art. One objective of the present invention is to provide a transmission device and a transmission method used in an OFDM-based communication system that enable easy and high-quality transmission of channels with different guard interval lengths.

Means for Solving the Problems

Embodiments of the present invention provide an OFDM-based transmission device. The transmission device includes a unicast channel generating unit configured to generate a unicast channel; a multicast broadcast channel generating unit configured to generate a multicast broadcast channel; a multiplexing unit configured to time-division-multiplex the unicast channel and the multicast broadcast channel in the same frequency band; and a transmitting unit configured to transmit time-division-multiplexed transmission symbols. In the transmission device, the guard interval length for the multicast broadcast channel is set longer than the guard interval length for the unicast channel.

Advantageous Effect of the Invention

Embodiments of the present invention enable easy and high-quality transmission of channels with different guard interval lengths in an OFDM-based communication system.

EXPLANATION OF REFERENCES

11 MBMS processing unit
111 Turbo coding unit
112 Data modulation unit
113 Interleaver
12 Unicast data processing unit
121 Turbo coding unit
122 Data modulation unit
123 Interleaver
13 MCS setting unit
14 First multiplexing unit
15 Serial/parallel conversion unit (S/P)
16 Second multiplexing unit (MUX)
17 Inverse fast Fourier transforming unit (IFFT)
18 Guard interval insertion unit
19 Digital-to-analog conversion unit (D/A)
20 Radio parameter setting unit

BEST MODE FOR CARRYING OUT THE INVENTION

According to an embodiment of the present invention, a unicast channel and a multicast broadcast channel are time-division-multiplexed (TDM) in the same frequency band, and the guard interval length for the multicast broadcast channel is longer than the guard interval length for the unicast channel. Time-division-multiplexing channels with different guard interval lengths in the same frequency band makes it possible to easily separate the channels during demodulation and enables easy and high-quality transmission of the channels. In this embodiment, a transmission signal is composed of OFDM symbols. Therefore, it is possible to increase the path diversity gain and improve the signal quality at the receiving end by using a long guard interval for multicast broadcast channels used to transmit the same data from multiple base stations. On the other hand, it is possible to improve the data transmission efficiency (throughput) by using a short guard interval for unicast channels. Because the channels are time-division-multiplexed, it is possible to directly obtain the benefits resulting from the guard interval length.

A radio frame may be composed of multiple subframes, and channels may be time-division-multiplexed such that a transmission period for the unicast channel and a transmission period for the multicast broadcast channel are switched one or more times within one radio frame. For example, time-division multiplexing may be performed by subframes. Switching transmission periods by time units shorter than a radio frame makes it possible to flexibly change the frame structure and also to reduce transmission delay.

Meanwhile, when a broad frequency band (e.g., about 20 MHz) is allocated for a system, it is possible to transmit a multicast broadcast channel and a unicast channel by frequency-division multiplexing where a part of the frequency band is allocated for the multicast broadcast channel and the remaining part of the frequency band is allocated for the unicast channel.

According to another embodiment of the present invention, multiple combinations of modulation schemes and channel coding rates may be provided. In this embodiment, data modulation and channel coding of a multicast broadcast channel may be performed according to a combination selected based on the type of the multicast broadcast channel. In this case, a combination with a higher information rate may be selected as the information rate of the multicast broadcast channel becomes higher. This approach makes it possible to provide high-throughput data transmission for a user with good channel quality and to provide a minimum service for a user with poor channel quality.

According to another embodiment of the present invention, unicast channels may be multiplied by different scramble codes provided at least for respective cells, and a scramble code common to multiple cells may be used to multiply multicast broadcast channels. This approach makes it possible to appropriately combine instances of the same multicast broadcast channel arriving from multiple cells and also to effectively reduce the signal degradation caused by different multicast broadcast channels and unicast channels.

In this embodiment, a scramble code for unicast channels is provided for each cell or sector and a scramble code for multicast broadcast channels is provided for each area (an area is composed of multiple cells where the same multicast broadcast channel is transmitted). As a result, the number or types of scramble codes used in a system becomes greater than that in a conventional system. However, because channels are time-division-multiplexed, the scramble codes for multicast broadcast channels are not likely to cause interference when distinguishing different cells or sectors at the receiving end, and the scramble codes for unicast channels are not likely to cause interference when distinguishing different areas. Thus, with this approach, although the number of scramble codes used in a system increases, the interference caused when distinguishing different cells or sectors can be limited to a conventional level and also the interference caused when distinguishing different areas can be reduced.

According to another embodiment of the present invention, broadcast information including at least one of information indicating a radio frame structure, information indicating a combination of a modulation scheme and a channel coding rate used for a multicast broadcast channel, and information indicating a scramble code by which the multicast broadcast channel is multiplied may be transmitted via a broadcast channel or via a shared data channel as L3 control information. This approach eliminates the need to provide a separate control channel used to demodulate the multicast broadcast channel.

According to still another embodiment of the present invention, a delay unit for delaying the transmission timing of the multicast broadcast channel may be provided for at least one transmitting antenna of the base station. Performing delay diversity makes it possible to more reliably achieve the path diversity gain.

First Embodiment

Below, a system employing orthogonal frequency division multiplexing (OFDM) for downlink is used to describe embodiments of the present invention. However, the present invention may also be applied to systems using other multi-carrier schemes.

Figure 1:
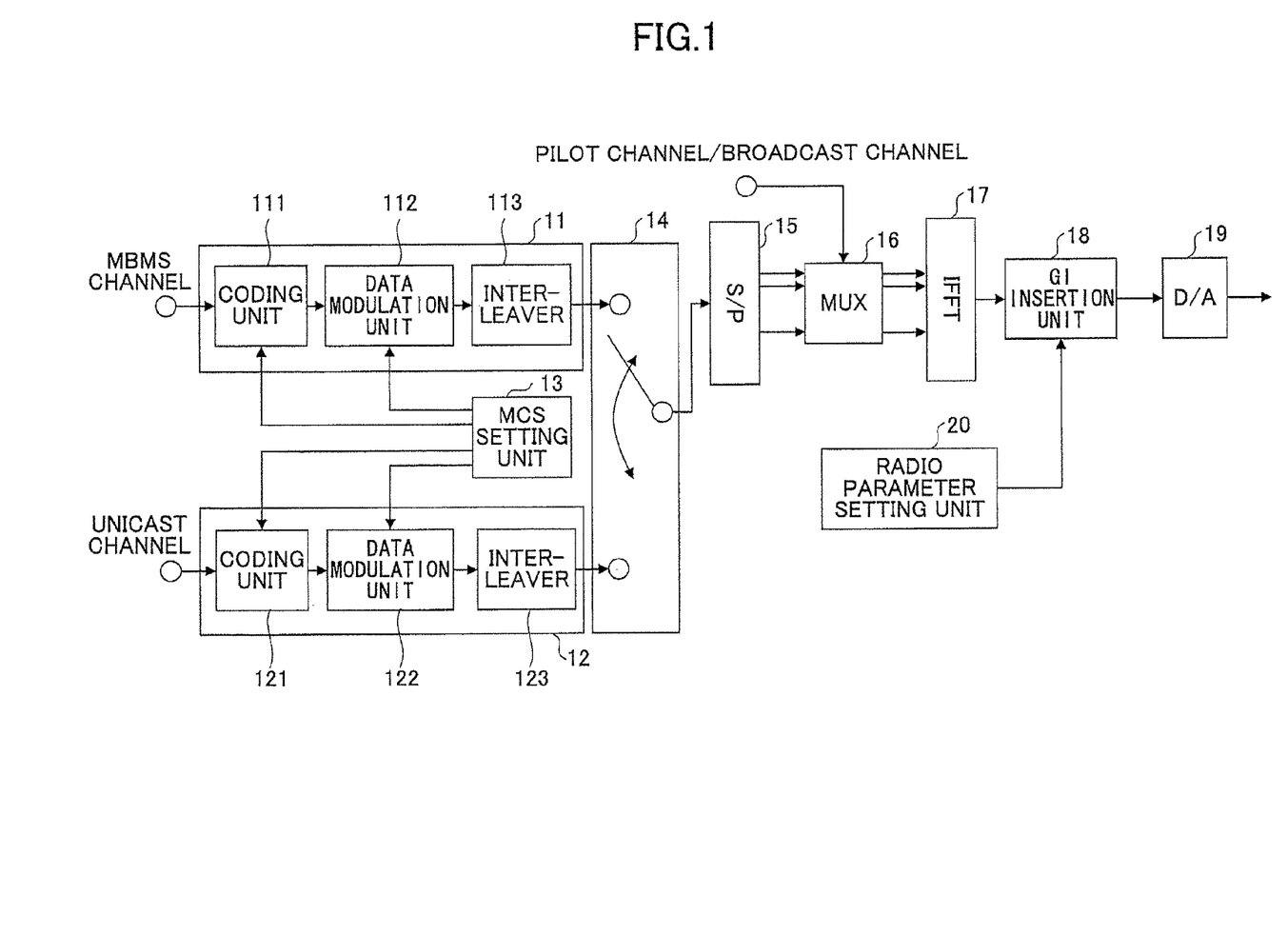
FIG. 1 is a schematic block diagram illustrating a transmission device according to an embodiment of the present invention.

FIG. 1 is a schematic block diagram illustrating a transmission device according to an embodiment of the present invention. The transmission device is typically provided in a base station as in this embodiment, but may also be provided in other types of devices. The base station includes an MBMS processing unit 11, a unicast data processing unit 12, an MCS setting unit 13, a first multiplexing unit 14, a serial/parallel conversion unit (S/P) 15, a second multiplexing unit (MUX) 16, an inverse fast Fourier transforming unit (IFFT) 17, a guard interval insertion unit 18, a digital-to-analog conversion unit 19, and a radio parameter setting unit 20. The MBMS processing unit 11 includes a channel turbo coding unit 111, a data modulation unit 112, and an interleaver 113. The unicast data processing unit 12 includes a turbo coding unit 121, a data modulation unit 122, and an interleaver 123.

The MBMS processing unit 11 performs processing related to multimedia broadcast multicast service (MBMS) channels. An MBMS channel includes multimedia information, such as voice, text, image, and video, to be broadcast to multiple specified or unspecified users.

The coding unit 111 performs channel coding to improve error resilience of MBMS channels. Various methods known in the art, such as convolution coding and turbo coding, may be used for the channel coding. The channel coding rate may be fixed or may be changed as described later according to a request from the MCS setting unit 13.

The data modulation unit 112 performs data modulation of MBMS channels based on a proper modulation scheme such as QPSK, 16QAM, or 64QAM. The modulation scheme may be fixed or may be changed as described later according to a request from the MCS setting unit 13.

The interleaver 113 changes the order of data in each MBMS channel according to a predetermined pattern.

The unicast data processing unit 12 performs processing related to a unicast channel to be sent to specified users (typically, to one user).

The coding unit 121 performs channel coding to improve error resilience of unicast channels. Various methods known in the art, such as convolution coding and turbo coding, may be used for the channel coding. In this embodiment, adaptive modulation and coding (AMC) is applied to unicast channels and the channel coding rate is adaptively changed according to a request from the MCS setting unit 13.

The data modulation unit 122 performs data modulation of unicast channels based on a proper modulation scheme such as QPSK, 16QAM, or 64QAM. In this embodiment, AMC is applied to unicast channels and the modulation scheme is adaptively changed according to a request from the MCS setting unit 13.

The interleaver 123 changes the order of data in each unicast channel according to a predetermined pattern.

Although omitted in FIG. 1, a processing unit similar to the processing units 11 and 12 is also provided for control channels. However, AMC is not applied to control channels.

The MCS setting unit 13 requests the corresponding processing units to change combinations of modulation schemes and coding rates used for MBMS channels and unicast channels as necessary. The combinations of modulation schemes and coding rates are identified by assigned numbers (MCS numbers).

Figure 2:
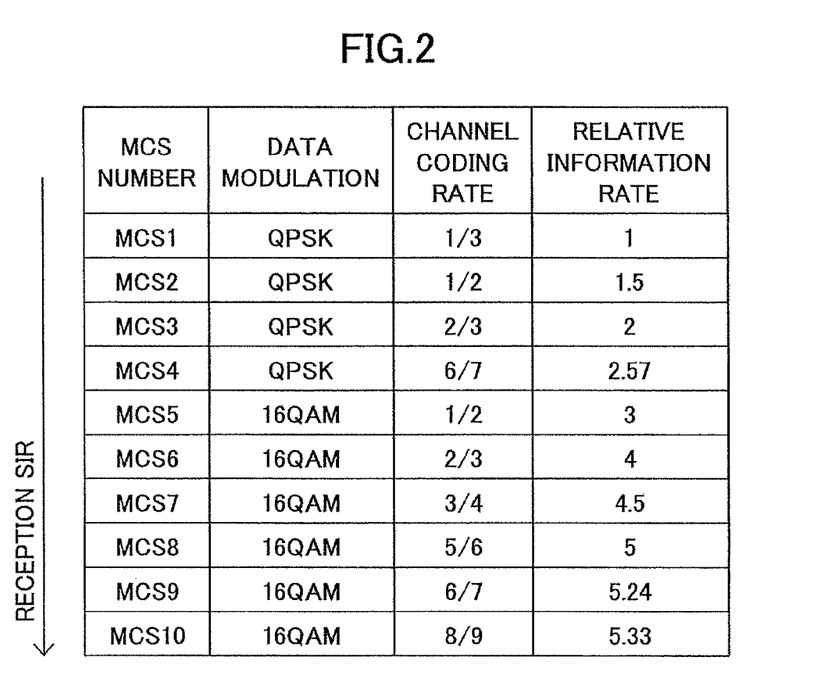
FIG. 2 is a table showing exemplary combinations of data modulation schemes and channel coding rates.

FIG. 2 is a table showing exemplary combinations of data modulation schemes and channel coding rates. In the example shown in FIG. 2, relative information rates are also provided and MCS numbers are assigned to the combinations in ascending order of the information rates. In AMC, one or both of the modulation scheme and the coding rate are adaptively changed according to channel quality to achieve required signal quality at the receiving end. The channel quality may be determined based on the reception quality (e.g., reception SIR) of a downlink pilot channel. Assuming that the transmission power from the base station is constant, it is expected that the channel quality of user 1 located far from the base station is poor. In such a case, the modulation level and/or the channel coding rate is set at a small value, i.e., a combination with a small MCS number is used. On the other hand, the channel quality of user 2 located close to the base station is expected to be good. Therefore, in this case, the modulation level and/or the channel coding rate is set at a large value, i.e., a combination with a large MCS number is used. This approach makes it possible to provide required signal quality for a user with poor channel quality by improving the reliability, and to maintain required signal quality and improve the throughput for a user with good channel quality. When AMC is employed, information such as the modulation scheme, the coding rate, and the number of symbols of a received channel is necessary to demodulate the channel. Therefore, it is necessary to report the information to the receiving end by a certain method.

The first multiplexing unit 14 shown in FIG. 1 time-division-multiplexes an MBMS channel and a unicast channel in the same frequency band.

The serial/parallel conversion unit (S/P) 15 converts a serial signal stream into parallel signal streams. The number of parallel signal streams may be determined based on the number of subcarriers.

The second multiplexing unit (MUX) 16 multiplexes data streams representing an output signal from the first multiplexing unit 14 with a pilot channel and/or a broadcast channel. The multiplexing may be performed by time-division multiplexing, frequency-division multiplexing, or a combination of them.

The inverse fast Fourier transforming unit (IFFT) 17 inverse-fast-Fourier-transforms an input signal and thereby OFDM-modulates the signal.

The guard interval insertion unit 18 generates transmission symbols by attaching guard intervals to the OFDM-modulated symbols. As is known, a guard interval is generated by duplicating a series of data including data at the head of a symbol to be transmitted and a transmission symbol is generated by attaching the series of data to the end of the symbol. Alternatively, a guard interval may be generated by duplicating a series of data including data at the end of a symbol to be transmitted and a transmission symbol may be generated by attaching the series of data to the head of the symbol.

The digital-to-analog conversion unit (D/A) 19 converts a baseband digital signal into an analog signal.

The radio parameter setting unit 20 sets radio parameters used for communications. The (group of) radio parameters include information defining the format of OFDM-modulated symbols, and may also include information indicating the duration $T_{GI}$ of each guard interval, the duration of each effective symbol section, the proportion of a guard interval in a symbol, and a subcarrier interval $\Delta f$. The duration of the effective symbol section is equal to the reciprocal $(1/\Delta f)$ of the subcarrier interval.

The radio parameter setting unit 20 sets appropriate radio parameters according to communication conditions or requests from other devices. The radio parameter setting unit 20 may be configured to select a radio parameter group depending on whether a unicast channel or an MBMS channel is to be transmitted. For example, the radio parameter setting unit 20 uses a group of radio parameters defining a shorter guard interval for unicast channels and uses a group of radio parameters defining a longer guard interval for MBMS channels. The radio parameter setting unit 20 may be configured to calculate a group of appropriate radio parameters each time or to select one of plural radio parameter groups stored in a memory depending on the need.

Figure 3A:
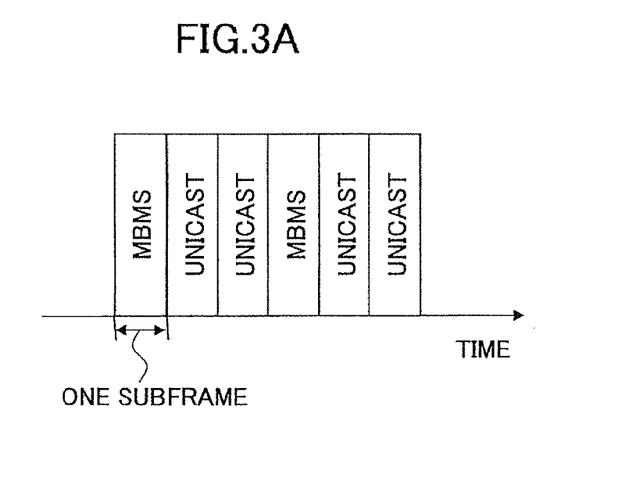
FIG. 3A is a drawing illustrating time-division multiplexing by subframes.
Figure 3B:
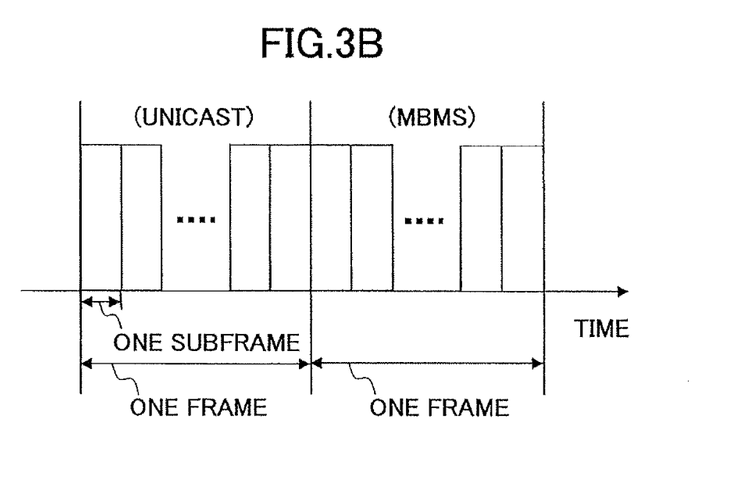
FIG. 3B is a drawing illustrating time-division multiplexing by radio frames.
Figure 3C:
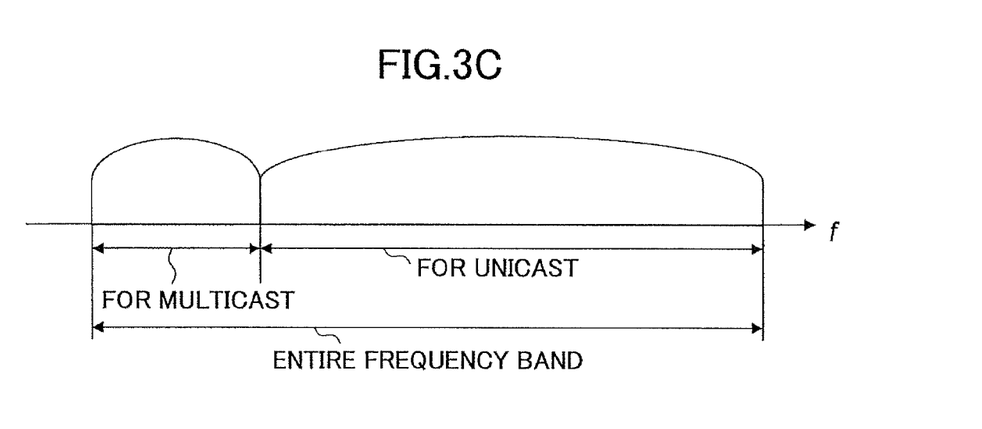
FIG. 3C is a drawing illustrating frequency-division multiplexing.

An MBMS channel input to the MBMS processing unit of FIG. 1 and a unicast channel input to the unicast data processing unit of FIG. 1 are encoded and modulated with appropriate coding rates and modulation schemes corresponding to the MCS numbers specified and are time-division-multiplexed after being interleaved individually. The time-division multiplexing may be performed by various time units such as radio frames and subframes constituting each radio frame. FIG. 3A is a drawing illustrating time-division multiplexing by subframes. The duration of a subframe is, for example, 0.5 ms and may be equal to the transmission time interval (TTI). FIG. 3B is a drawing illustrating time-division multiplexing by radio frames each including multiple subframes. The duration of a radio frame is, for example, 10 ms. The above values are just examples and time-division multiplexing may be performed by various time units. Performing time-division multiplexing by short time units as shown in FIG. 3A makes it possible to finely adjust the transmission time interval of an MBMS channel (or a unicast channel) as needed and is therefore preferable in terms of reducing the transmission delay of channels. This approach is also preferable in terms of reducing the retransmission interval in automatic repeat request (ARQ). On the other hand, performing time-division multiplexing by comparatively long time units as shown in FIG. 3B makes it possible to transmit sets of large data in succession.

The time-division-multiplexed channels are also multiplexed with a pilot channel or a broadcast channel if needed, and are inverse-fast-Fourier-transformed for OFDM modulation. Then, guard intervals are attached to the modulated symbols and baseband OFDM symbols are output. The baseband OFDM symbols are converted into an analog signal and the analog signal is transmitted via a transmitting antenna(s).

In this embodiment, an MBMS channel and a unicast channel are time-division-multiplexed for transmission. Therefore, a receiving device can easily separate the channels with a small amount of interference. In addition, because a transmission signal is composed of OFDM symbols, it is possible to increase the path diversity gain and improve the signal quality at the receiving end by using a long guard interval for MBMS channels. On the other hand, it is possible to improve the data transmission efficiency (throughput) by using a short guard interval for unicast channels. Because the MBMS and unicast channels are time-division-multiplexed, it is possible to directly obtain the benefits resulting from the guard interval length.

Meanwhile, when a broad frequency band (e.g., about 20 MHz) is allocated for a system, it is possible to allocate a part of the frequency band for a multicast broadcast channel and to allocate the remaining part of the frequency band for a unicast channel. Thus, it is possible to transmit a multicast broadcast channel and a unicast channel by frequency-division multiplexing.

Second Embodiment

In the above embodiment, the modulation scheme and the channel coding rate of a unicast channel are adaptively changed according to channel quality of the user to improve the throughput while achieving required signal quality. However, since an MBMS channel is broadcast to multiple users, it is not appropriate to change the MCS number based on the channel quality of one specific user. Rather, it is more important to ensure minimum signal quality for multiple users. Meanwhile, it is not necessary to prevent the change of the MCS number used for an MBMS channel as long as the minimum signal quality is achieved.

According to a second embodiment of the present invention, multiple MCS numbers are provided for MBMS channels. The MCS numbers may be selected from those provided for unicast channels, or separate MCS numbers may be provided for MBMS channels. In this example, MCS1 through MCS 10 shown in FIG. 2 are used for unicast channels, and MCS1 through MCS3 are used for MBMS channels. The number of MCS numbers and the combinations of modulation schemes and channel coding rates may be changed according to the purposes.

The MCS number for an MBMS channel is changed or selected according to the type of the MBMS channel or its application. The type of an MBMS channel is, for example, represented by a data rate or the quality of service (QoS) defined by parameters such as delay and packet error rate. For example, an MCS number (e.g., MCS3) with a high information rate is used for an application, such as transmitting a large video stream, that requires a high information rate. On the other hand, an MCS number (e.g., MCS1) with a low information rate is used for an application, such as transmitting simple text data, that requires a low information rate. If a high MCS number is used for an application requiring a high information rate, users with good channel quality can receive the data at high throughput, but users with poor channel quality may not be able to smoothly receive the data. However, in terms of information transmission efficiency, it is not preferable to use a low MCS number for an application requiring a high information rate to suit users with poor channel quality. In the first place, users with poor channel quality are not suited to receive data with a high information rate. Meanwhile, even users with poor channel quality can smoothly receive data transmitted at a low information rate using a low MCS number. Thus, it is preferable to use different MCS numbers according to the types of applications to improve the information transmission efficiency while maintaining minimum service levels for many users.

Third Embodiment

In embodiments of the present invention, the same MBMS channel is transmitted via multiple cells. A mobile terminal (more generally, any communication terminal including a mobile terminal and a fixed terminal; here, a mobile terminal is used for descriptive purposes) receives instances of the same MBMS channel arriving from multiple cells. The MBMS channel forms multiple incoming waves or paths depending on the length of the radio propagation path. Because of characteristics of OFDM symbols, if the delay between the incoming waves is within a guard interval, it is possible to combine (soft-combine) the incoming waves without causing intersymbol interference and thereby to improve the reception quality based on path diversity. For this reason, the guard interval length for MBMS channels is set longer than the guard interval length for unicast channels.

Meanwhile, to combine incoming waves of the same MBMS channel arriving from multiple cells by a mobile terminal as described above, it is necessary for the mobile terminal to identify that the incoming waves are of the same MBMS channel. Therefore, it is not appropriate to multiply the MBMS channel by different scramble codes for the respective cells or sectors as in the case of unicast channels.

According to a third embodiment of the present invention, the MBMS channel is transmitted via multiple cells without being multiplied by scramble codes. This makes it possible for a mobile terminal belonging to multiple cells to properly combine multiple incoming waves of the same MBMS channel. This approach is suitable when an area where the same MBMS channel is transmitted is isolated. However, when different MBMS channels are transmitted in a comparatively large area, this approach may cause a significant amount of interference at cell edges.

This problem may be solved or reduced by providing a scramble code for each area where the same MBMS channel is transmitted, and by transmitting the MBMS channel multiplied by the same scramble code to cells in the same area.

Figure 4:
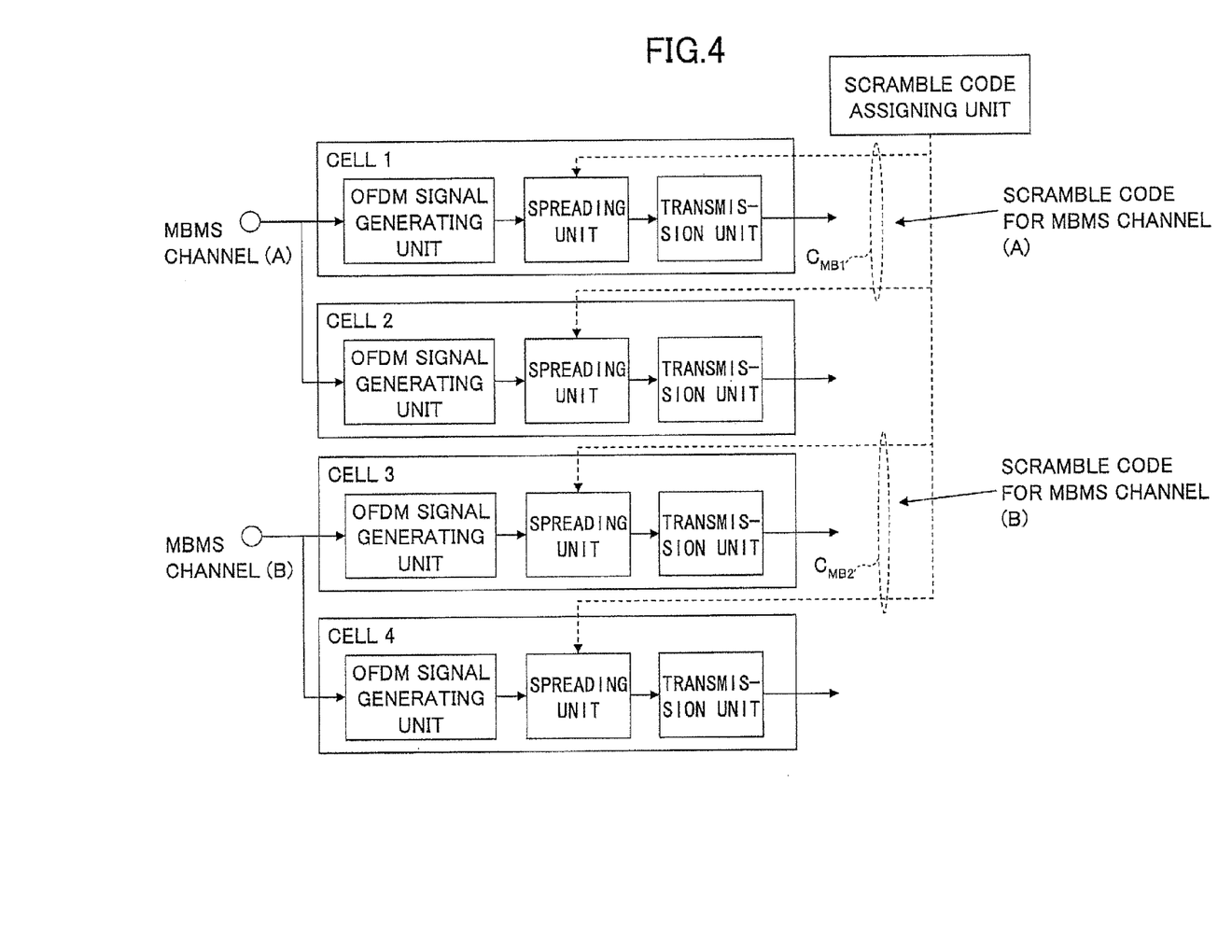
FIG. 4 is a partial block diagram illustrating a base station that uses a scramble code common to multiple cells for MBMS channels.

FIG. 4 is a partial block diagram of a base station used in the above approach. Note that FIG. 4 mainly shows components for multiplying MBMS channels by scramble codes. The base station includes processing units for transmitting channels for the respective cells. In FIG. 4, four processing units corresponding to four cells are provided. Each processing unit includes an OFDM signal generating unit for generating an OFDM signal, a spreading unit for multiplying the OFDM signal by a scramble code, and a transmission unit. As shown in FIG. 4, the same scramble code is used for the same MBMS channel. OFDM signals representing an MBMS channel (A) to be transmitted via cell 1 and cell 2 are multiplied by the same scramble code $C_{MB1}$ in the corresponding spreading units. OFDM signals representing an MBMS channel (B) to be transmitted via cell 3 and cell 4 are multiplied by the same scramble code $C_{MB2}$ in the corresponding spreading units. Normally, the scramble codes $C_{MB1}$ and $C_{MB2}$ are different from each other. Scramble codes are managed by a scramble code assigning unit.

Figure 5:
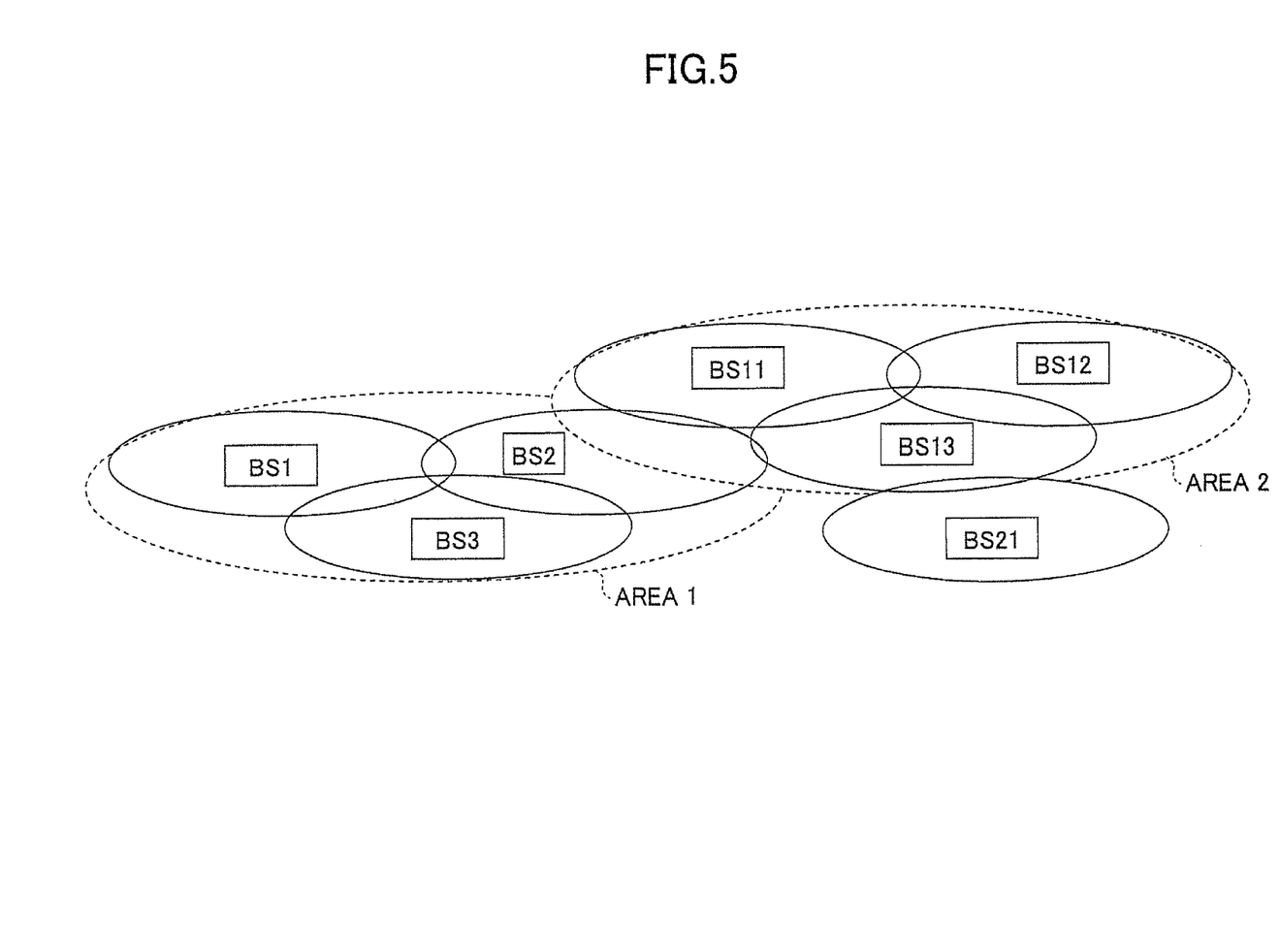
FIG. 5 is a drawing used to describe a case where different scramble codes are used for respective MBMS areas.

FIG. 5 is a drawing used to describe a case where different scramble codes are used for respective areas. FIG. 5 includes seven cells. Area 1 is composed of three cells belonging to base stations 1, 2, and 3 (BS1, BS2, and BS3), and the same MBMS channel is transmitted in area 1. Area 2 is composed of three cells belonging to base stations 11, 12, and 13 (BS11, BS12, and BS13), and the same MBMS channel is transmitted in area 2. The MBMS channels transmitted in areas 1 and 2 are (normally) different from each other. Each of the base stations 1, 2, and 3 in area 1 transmits the MBMS channel multiplied by the scramble code $C_{MB1}$. Each of the base stations 11, 12, and 13 in area 2 transmits the MBMS channel multiplied by the scramble code $C_{MB2}$. The scramble codes $C_{MB1}$ and $C_{MB2}$ are different from each other, and are, for example, represented by random sequences. The scramble codes $C_{MB1}$ and $C_{MB2}$ are dedicated for MBMS channels and are provided separately from scramble codes for unicast channels.

Because different scramble codes are used for areas 1 and 2, a mobile terminal located near the boundary of areas 1 and 2 can distinguish received MBMS channels based on the scramble codes. In this case, a mobile terminal located at a cell edge soft-combines received MBMS channels if the cell edge is not the boundary of areas, or processes received signals by ignoring irrelevant MBMS channels if the cell edge is the boundary of areas. This approach makes it possible to effectively reduce signal quality degradation caused when combining different MBMS channels.

In this embodiment, a scramble code for unicast channels is provided for each cell or sector, and also a scramble code for MBMS channels is provided for each area (an area is composed of multiple cells where the same MBMS channel is transmitted). Therefore, the number or types of scramble codes used in a system becomes greater than that in a conventional system. However, because unicast and MBMS channels are time-division-multiplexed, the scramble codes for MBMS channels are not likely to cause interference when distinguishing different cells or sectors at the receiving end, and the scramble codes for unicast channels are not likely to cause interference when distinguishing different areas. Thus, with this embodiment, although the number of scramble codes used in a system increases, the interference caused when distinguishing different cells or sectors can be limited to a conventional level and also the interference caused when distinguishing different areas can be reduced.

Fourth Embodiment

To properly receive and demodulate instances of the same MBMS channel arriving from multiple cells, the mobile terminal has to receive, in advance, control information including information indicating a radio frame structure, information (MCS number) indicating a combination of a modulation scheme and a channel coding rate used for the MBMS channel, and information indicating a scramble code for multiplying the MBMS channel. The information indicating a radio frame structure includes, for example, the transmission timing of a unicast channel, the transmission timing of an MBMS channel, and a transmission interval. For example, the control information is transmitted via a broadcast channel. The broadcast channel is multiplexed with other channels by the second multiplexing unit 16 shown in FIG. 1. Alternatively, the control information may be transmitted to the mobile terminal as C-plane information via a shared data channel.

Fifth Embodiment

As described above, AMC is applied to unicast channels. When AMC is employed, scheduling information including the modulation scheme, the coding rate, and the number of symbols of a received channel is necessary to demodulate the channel. Therefore, it is necessary to report the scheduling information to the mobile terminal by a certain method. A control channel including such scheduling information is called an L1/L2 signaling control channel and is transmitted via a shared control channel using packets shared by users. On the other hand, as described in the fourth embodiment, control information necessary to demodulate an MBMS channel is reported in advance to the mobile terminal, for example, via a broadcast channel. Therefore, it is not necessary to send a control channel like an L1/L2 signaling control channel to the mobile terminal for demodulation of the MBMS channel.

Figure 6:
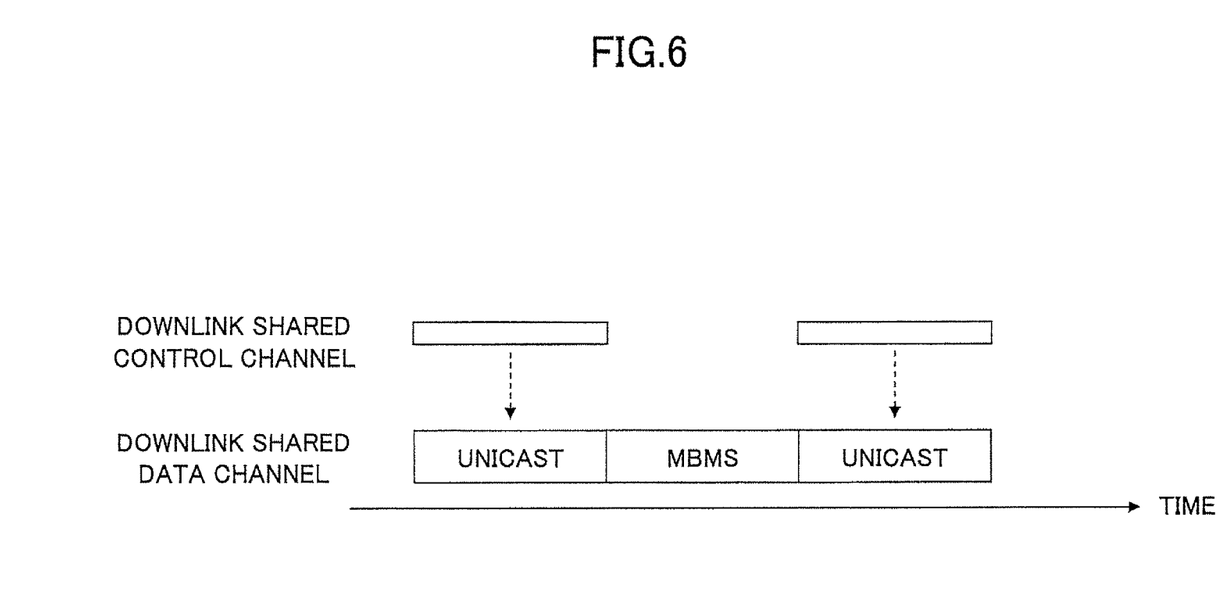
FIG. 6 is a drawing illustrating a method of transmitting a shared control channel.

Accordingly, as exemplified in FIG. 6, although a shared control channel is multiplexed with the corresponding unicast channel, it is not necessary to multiplex a shared control channel in the transmission period of the MBMS channel.

Figure 7:
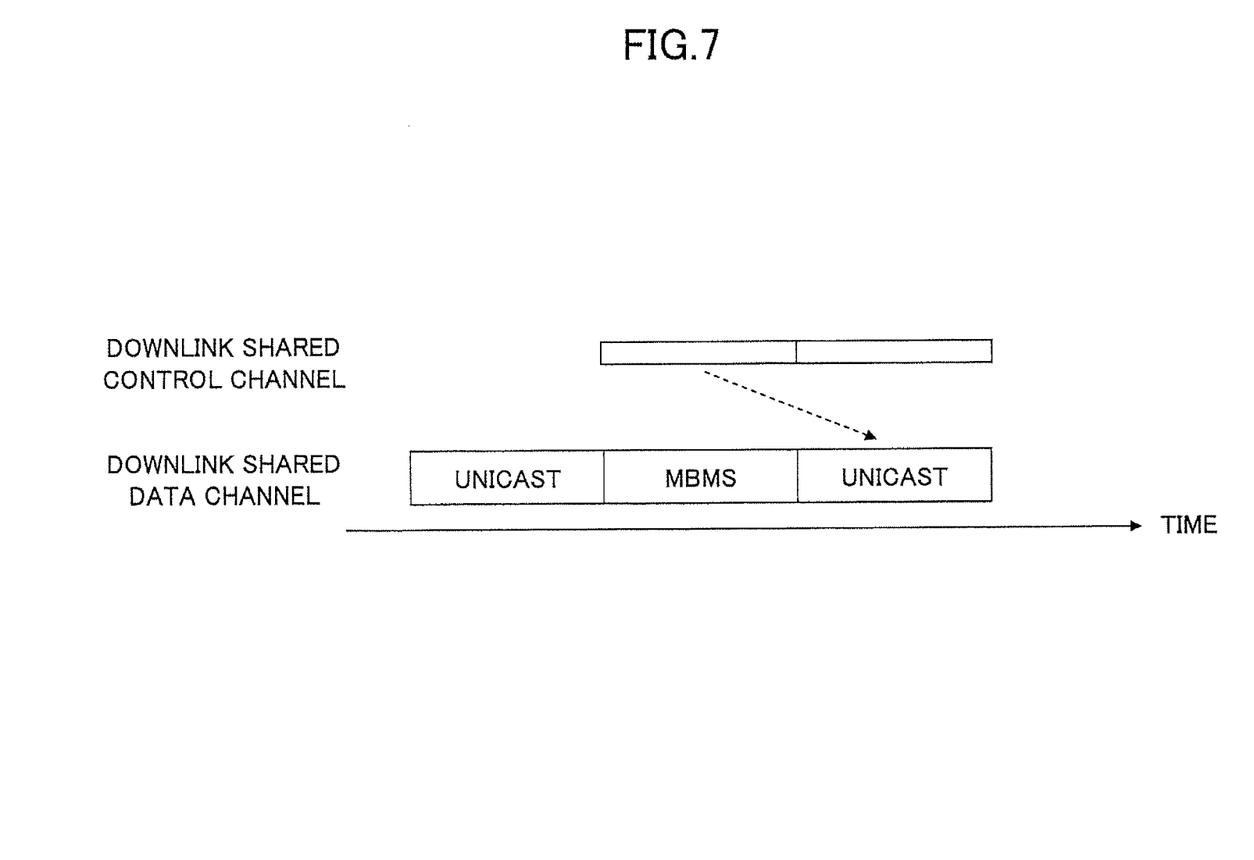
FIG. 7 is a drawing illustrating a method of transmitting a shared control channel.
Figure 8A:
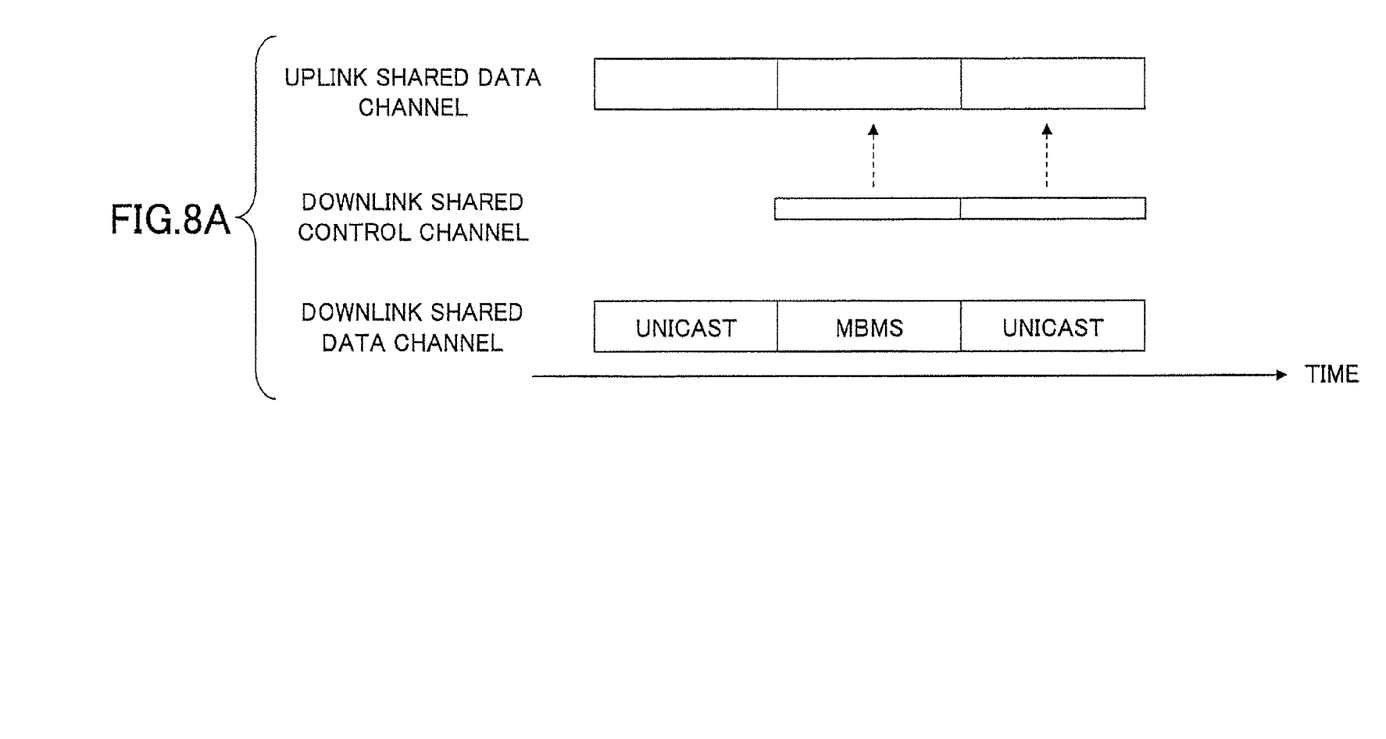
FIG. 8A is a drawing illustrating a method of transmitting a shared control channel.
Figure 8B:
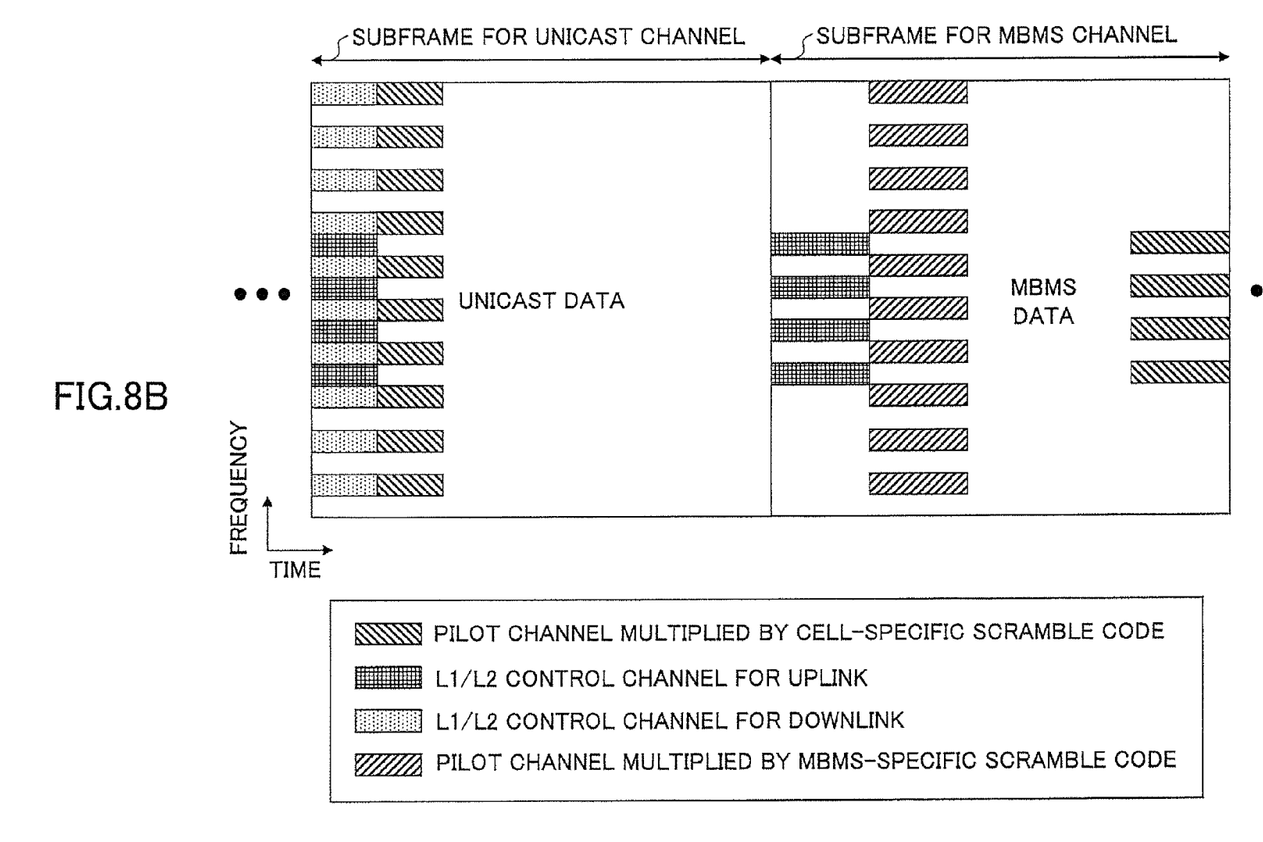
FIG. 8B is a drawing illustrating a case where an MBMS channel and a shared control channel are multiplexed.

Alternatively, as exemplified in FIG. 7, an MBMS channel and a shared control channel for a downlink unicast channel that follows the MBMS channel may be multiplexed and transmitted at the same time. Further, as exemplified in FIG. 8A, an MBMS channel and a shared control channel for an uplink unicast channel may be multiplexed and transmitted at the same time. In this case, as shown in FIG. 8B, the shared control channel and the MBMS channel may be transmitted as different symbols in a subframe. In other words, the shared control channel and the MBMS channel may be time-division-multiplexed by symbols that are smaller than subframes. In FIG. 8B, although symbols with the same pattern are of the same type, their lengths are different in the subframe for the unicast channel and in the subframe for the MBMS channel.

This indicates that guard interval lengths for the unicast channel and the MBMS channel are different.

Also, in addition to a pilot channel for the MBMS channel, an optional or auxiliary pilot channel may be used to demodulate the control channel for the unicast channel which control channel is to be transmitted at the same time as the MBMS channel.

As the pilot channel for the unicast channel, a second reference signal may be used.

Sixth Embodiment

Figure 9:
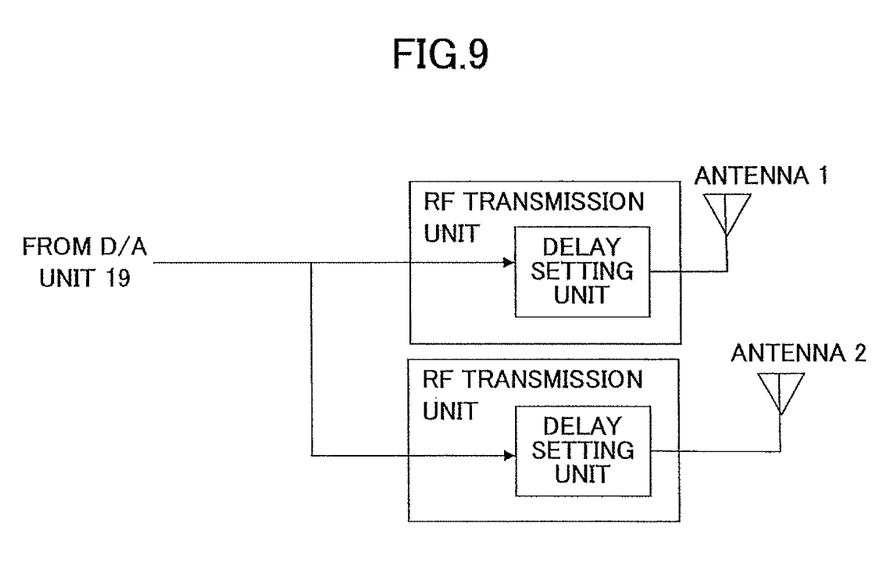
FIG. 9 is a drawing illustrating multiple transmitting antennas used for delay diversity.

In a sixth embodiment of the present invention, delay diversity is used in transmitting MBMS channels. FIG. 9 is a drawing illustrating transmitting antennas of a base station used in this embodiment. In the example shown in FIG. 9, the base station is equipped with two antennas 1 and 2, and delay setting units are provided in the respective signal paths leading to the antennas 1 and 2. Although the number of antennas in this example is two, any number of antennas may be used. Each delay setting unit sets a predetermined or specified delay for the corresponding signal path. To adjust the relative phase difference between the antennas, one of the two delay setting units may be omitted. However, to quickly adjust the phase difference, to improve the fault tolerance, and to increase the adjustment flexibility, it is preferable to provide a delay setting unit for each of the signal paths leading to the antennas 1 and 2.

A delay is set between the two signal paths by one or both of the delay setting units, and the same signal (especially, MBMS channel) is transmitted from the antennas 1 and 2 at different timings. As a result, the communication terminal receives at least two incoming waves of the same signal. In a multipath propagation environment, the number of incoming waves is represented by the following formula: (the number of paths observed when one antenna is used)×(the number of antennas). The communication terminal demodulates a transmission signal by combining multiple incoming waves of the same transmission signal. Combining multiple incoming waves achieves path diversity gain and therefore makes it possible to improve the reception quality compared with a case where one path is used.

Thus, it is possible to improve the reception quality by transmitting the same MBMS channel via multiple cells and by soft-combining multiple incoming waves of the MBMS channel from the cells at the communication terminal. In this embodiment, the base station is equipped with multiple antennas, a delay (or a phase difference) is set between the antennas, and delay diversity is performed in addition to path diversity. If delay diversity is not used, incoming waves of the MBMS channel from multiple cells may be received at substantially the same time in some areas, and the path diversity gain may become insufficient. Transmitting an MBMS channel at different timings and receiving incoming waves of the MBMS channel from multiple cells make it possible to increase the possibility of being able to separate the paths even in such areas and thereby to more reliably achieve path diversity gain.

The amount of delay to be set between antennas is preferably shorter than the guard interval length for the MBMS channel. For example, the amount of delay between antennas is set at a value that is enough to distinguish two paths. On the other hand, the length that allows distinction of paths is not enough for the guard interval. Instead, the guard interval is preferably long enough to accommodate incoming waves from multiple cells.

Figure 10:
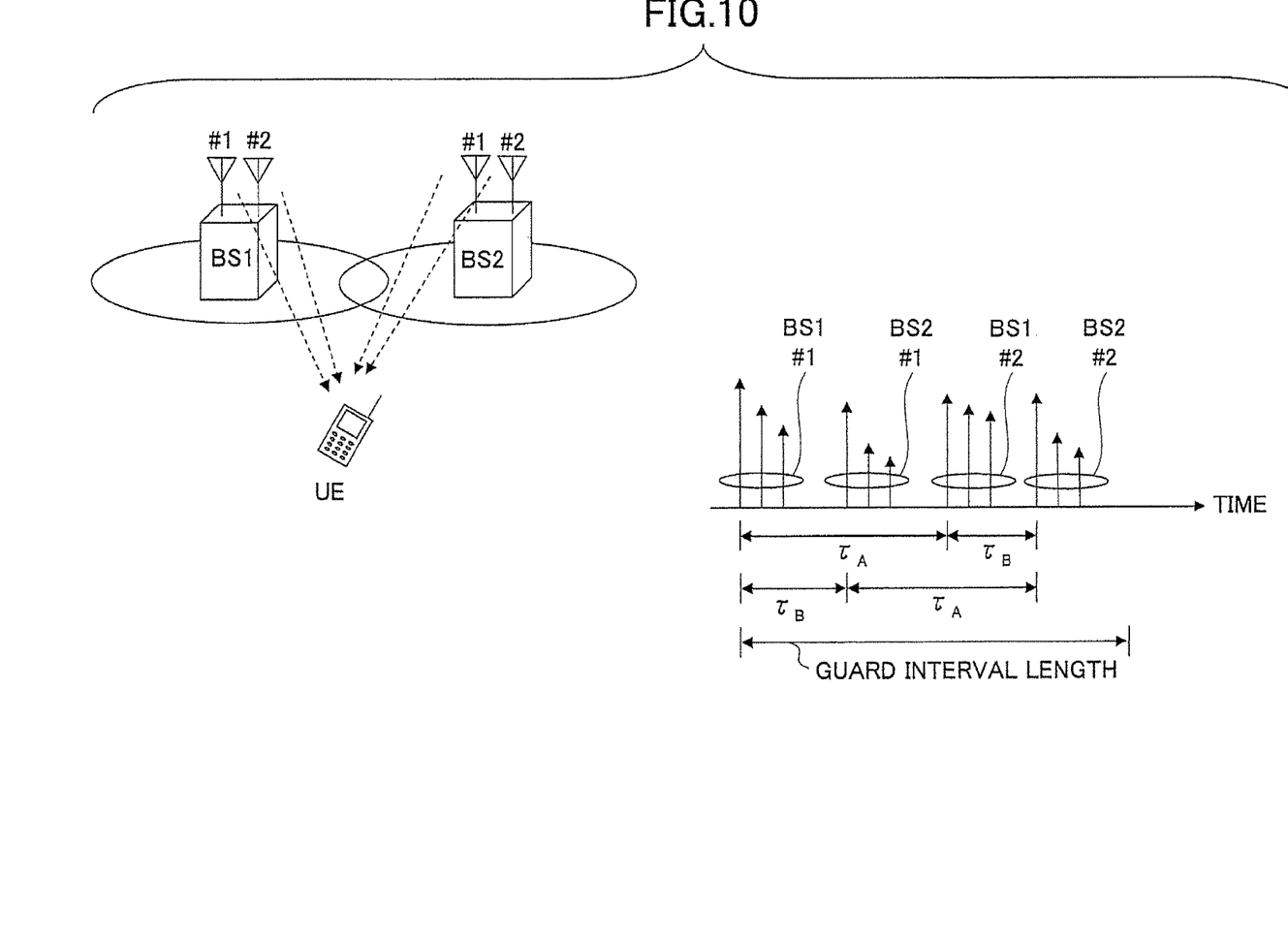
FIG. 10 is a drawing illustrating delay diversity.

Intentional delays for achieving delay diversity may be set not only between transmitting antennas of a base station but also between different base stations. For example, as shown in FIG. 10, the same MBMS channel may be transmitted from two base stations at different timings. In this example, three paths are formed by one antenna, a delay $\tau_A$ is set between antennas of each base station, and a delay $\tau_A$ is set between the base stations. As a result, the communication terminal receives 12 paths. If no delay is set between antennas of each base station ($\tau_A=0$), the communication terminal is able to receive only six paths. Thus, setting a delay between base stations makes it possible to more reliably achieve the path diversity gain.

The present invention is not limited to the specifically disclosed embodiments, and variations and modifications may be made without departing from the scope of the present invention. Although the present invention is described above in different embodiments, the distinctions between the embodiments are not essential for the present invention, and the embodiments may be used individually or in combination.

The present international application claims priority from Japanese Patent Application No. 2006-10497 filed on Jan. 18, 2006, the entire contents of which are hereby incorporated herein by reference.

The invention claimed is:

1. A transmission device, comprising:
a generating unit configured to generate a subframe including multiple OFDM symbols; and
a transmitting unit configured to transmit the subframe generated by the generating unit,
wherein the generating unit is configured to
scramble data contained in the respective OFDM symbols in the subframe,
scramble data for a unicast channel by a scramble code defined for each cell, and
scramble data for a multicast channel by a scramble code defined for each area composed of plural cells where the same multicast channel is transmitted,
wherein a unicast channel guard interval length for the unicast channel and a multicast channel guard interval length for the multicast channel which is longer than the unicast channel guard interval length are defined in the generating unit; and
wherein the transmission device comprises the following three manners, and the generating unit is configured to select one of the following three manners, to add guard intervals to the OFDM symbols in the subframe:
(1) adding guard intervals with the unicast channel guard interval length to all the OFDM symbols in the subframe,
(2) adding guard intervals with the multicast channel guard interval length to all the OFDM symbols in the subframe, and
(3) adding guard intervals with the unicast channel guard interval length to a subset of the OFDM symbols, adding guard intervals with the multicast channel guard interval length to another subset of the OFDM symbols, and time-division multiplexing the subsets of the OFDM symbols in the subframe,
wherein when adding the guard intervals to the OFDM symbols in the subframe in the manner (3), the generating unit is configured to map a control channel including scheduling information for the unicast channel only to the subset of the OFDM symbols to which the guard intervals with the unicast channel guard interval length are added.

2. A transmission method, comprising:
generating a subframe including multiple OFDM symbols; and
transmitting the generated subframe,
wherein the generating step comprises scrambling data contained in the respective OFDM symbols in the subframe; and
wherein data for a unicast channel is scrambled by a scramble code defined for each cell and data for a multicast channel is scrambled by a scramble code defined for each area composed of plural cells where the same multicast channel is transmitted,
wherein a unicast channel guard interval length for a unicast channel and a multicast channel guard interval length for a multicast channel which is longer than the unicast channel guard interval length are defined; and
wherein in the generating step, one of the following three manners, which are comprised in a transmission device, is selected to add guard intervals to the OFDM symbols in the subframe:

(1) adding guard intervals with the unicast channel guard interval length to all the OFDM symbols in the subframe,
(2) adding guard intervals with the multicast channel guard interval length to all the OFDM symbols in the subframe, and
(3) adding guard intervals with the unicast channel guard interval length to a subset of the OFDM symbols, adding guard intervals with the multicast channel guard interval length to another subset of the OFDM symbols, and time-division multiplexing the subsets of the OFDM symbols in the subframe,
wherein when the guard intervals are added to the OFDM symbols in the subframe in the manner (3), a control channel including scheduling information for the unicast channel is mapped only to the subset of the OFDM symbols to which the guard intervals with the unicast channel guard interval length are added.

* * * * *